United States Patent
Modi et al.

(10) Patent No.: US 10,477,582 B2
(45) Date of Patent: Nov. 12, 2019

(54) METHOD FOR OPPORTUNISTIC ACCESS TO THE SPECTRUM

(71) Applicant: INSTITUT NATIONAL DES SCIENCES APPLIQUEES (INSA), Rennes (FR)

(72) Inventors: Navikkumar Modi, Gujurat (IN); Christophe Moy, La Chapelle des Fougeretz (FR); Philippe Mary, Cesson-Sevigne (FR)

(73) Assignee: INSTITUT NATIONAL DES SCIENCES APPLIQUEES (INSA), Rennes (FR)

( * ) Notice: Subject to any disclaimer, the term of this patent is extended or adjusted under 35 U.S.C. 154(b) by 0 days.

(21) Appl. No.: 15/746,693

(22) PCT Filed: Jul. 19, 2016

(86) PCT No.: PCT/EP2016/067117
§ 371 (c)(1),
(2) Date: Jan. 22, 2018

(87) PCT Pub. No.: WO2017/013088
PCT Pub. Date: Jan. 26, 2017

(65) Prior Publication Data
US 2018/0227956 A1 Aug. 9, 2018

(30) Foreign Application Priority Data
Jul. 21, 2015 (FR) ...................................... 15 56916

(51) Int. Cl.
*H04W 74/08* (2009.01)
*H04W 16/14* (2009.01)
(Continued)

(52) U.S. Cl.
CPC ..... *H04W 74/0816* (2013.01); *H04L 25/0202* (2013.01); *H04W 16/14* (2013.01); *H04W 74/08* (2013.01); *H04W 88/08* (2013.01)

(58) Field of Classification Search
CPC .................................................. H04W 74/0816
See application file for complete search history.

(56) References Cited

U.S. PATENT DOCUMENTS 9,144,082 B2 * 9/2015 Rubin .................... H04W 72/12
2004/0137915 A1 * 7/2004 Diener ................ H04L 41/0896
455/456.1
(Continued)

FOREIGN PATENT DOCUMENTS

EP 2205016 A1 7/2010
WO 2009031825 A2 3/2009
WO 2010047763 A1 4/2010

OTHER PUBLICATIONS

English translation of the Written Opinion of the International Searching Authority dated Aug. 24, 2016, for International Application No. PCT/EP2016/067117, filed Jul. 19, 2016.
(Continued)

*Primary Examiner* — Andrew Lai
*Assistant Examiner* — Andrew C Lee
(74) *Attorney, Agent, or Firm* — David D. Brush; Westman, Champlin & Koehler, P.A.

(57) ABSTRACT

A method of opportunistic access to a frequency band dedicated to a synchronous primary network by a secondary user. The frequency band is divided into K independent channels to which an indicator $B_k$ and an average availability $\overline{S}_k$ are assigned. At each time frame t, the method includes observing, by the secondary user, the channel i having the greatest indicator $B_i(t)$; and if the channel i is busy, updating the average availability $\overline{S}_i$ of channel i and updating indicator $B_i(t)$ of the channel as a function of $\overline{S}_i$, and if the
(Continued)

Figure 1:
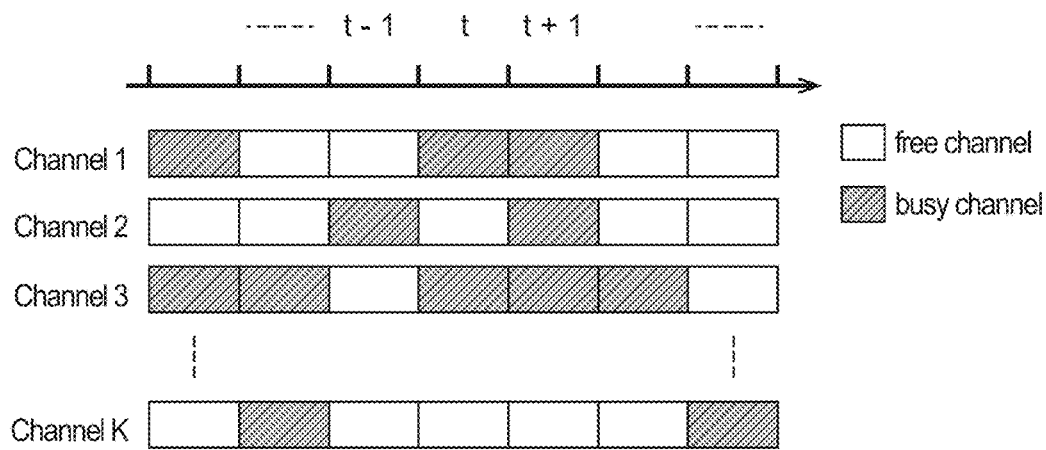
Figure 1:

channel i is free: updating the average availability $\overline{S}_i$ of channel i, transmitting data set up during the frame t on channel i, computing a quality index $R_i(t)$ of channel i, and updating indicators $B_k(t)$ of the K channels as a function of the average availabilities $\overline{S}_k$ and $R_i(t)$.

8 Claims, 2 Drawing Sheets

(51) Int. Cl.
  *H04L 25/02* (2006.01)
  *H04W 88/08* (2009.01)

(56) References Cited

U.S. PATENT DOCUMENTS

| | | | | |
|---|---|---|---|---|
| 2013/0077477 | A1* | 3/2013 | Daraiseh | H04W 40/22 370/225 |
| 2014/0297292 | A1* | 10/2014 | Marko | G10L 19/00 704/500 |
| 2015/0004918 | A1* | 1/2015 | Wang | H04W 88/02 455/73 |
| 2016/0277946 | A1* | 9/2016 | Sofuoglu | H04W 24/02 |
| 2016/0337426 | A1* | 11/2016 | Shribman | H04L 65/4084 |
| 2017/0230915 | A1* | 8/2017 | Kim | H04W 72/12 |
| 2017/0311341 | A1* | 10/2017 | Patil | H04L 12/18 |

OTHER PUBLICATIONS

International Search Report and English Translation dated Aug. 24, 2016, for International Application No. PCT/EP2016/067117, filed Jul. 19, 2016.

Written Opinion of the International Searching Authority dated Aug. 24, 2016, for International Application No. PCT/EP2016/067117, filed Jul. 19, 2016.

Qing Zhao et al: "Decentralized cognitive MAC for opportunistic spectrum access in ad hoc networks: A POMDP framework", IEEE Journal on Selected Areas in Communications, IEEE Service Center, Piscataway, US, vol. 25, No. 3, Apr. 1, 2007 (Apr. 1, 2007), pp. 589-600, XP011177058.

\* cited by examiner

METHOD FOR OPPORTUNISTIC ACCESS TO THE SPECTRUM

1. CROSS-REFERENCE TO RELATED APPLICATIONS

This Application is a Section 371 National Stage Application of International Application No. PCT/EP2016/067117, filed Jul. 19, 2016, the content of which is incorporated herein by reference in its entirety, and published as WO 2017/013088 on Jan. 26, 2017, not in English.

2. FIELD OF THE INVENTION

The invention relates to the exploitation of spectral resources and, more particularly, to opportunistic spectrum access for radiocommunications.

The static allocation of frequency bands to different wireless radiocommunications applications and services has led to a scarcity of spectral resources. However, many studies have shown that there is chronic under-utilization of the frequency bands considered. This represents a major opportunity in communications.

It is in this context that the concept of opportunistic spectrum access has been proposed.

3. PRIOR ART

The concept of opportunistic spectrum access defines two classes of users: primary users and secondary users. Primary users have priority access to spectral resources that are dedicated to their services. Secondary users, as opposed to primary users, are non-priority users seeking to use the opportunity of access to spectral resources not utilized by primary users at a given point in time.

The method of opportunistic spectrum access by secondary users to the frequency bands of a primary network that is also being used by a population of priority primary users therefore needs to be optimized.

We shall consider only a synchronous primary network, i.e. one for which time is subdivided into slots or intervals of constant duration, also called time frames in the present disclosure.

The frequency band dedicated to the primary network is divided into K subbands of independent frequencies, called channels. During each time frame t, each channel is either in a "free" state, and this channel then represents an opportunity for a secondary user to access the corresponding spectrum, or in a "busy" state, being used, for example, by a primary user during this particular time frame.

Here below in the present disclosure, the term "secondary user" will denote a radio apparatus or device, provided with different detectors enabling it to obtain information on its environment and especially on the state in which a channel k is during a time frame t. The secondary user is also provided with radiocommunications (sending, receiving) means, electronic memory, at least one microprocessor-type computation element and a battery. A computer program product executed by the microprocessor makes the device work.

The secondary user is considered, in principle, to have no knowledge of the availability of the different channels at an instant t, nor of the probability that a particular channel k will be available at an instant t. To make optimum use of the spectral resources, this user will then have to learn the characteristics of the primary network and especially estimate the probability of availability of each channel. The user will have numerous variables at its disposal. These variables will be computed and made more precise as and when the user collects information on its environment. These variables must be initialized, for example in being fixed at an arbitrary value, or else by the execution of an initialization phase in which each channel is scanned at least once.

According to the rules of reinforcement learning, a smart agent observes its environment described by a state, and then this smart agent takes a decision leading to an action and the agent receives a reward (also called a win) as a function of the action and of the state. Numerous prior-art methods of opportunistic access use a Markov decision-making process to model the development of the state of a channel.

In the context considered, the smart agent is the program executed by the secondary user's microprocessor: it observes its environment and, at each time frame, it decides to try and communicate with a distant secondary user in using a particular channel k during a time frame t. The communication will fail or it will be carried out depending on whether the channel is busy or free during the frame t considered.

The model known as the "multi-armed bandit model" is one particular case of a decision-making process that can be applied to a Markov model of the primary network, and more particularly to the occupancy of the frequency channels by the primary users in which the smart agent is considered to be a casino gambler who has to choose to gamble on one among several slot machines having different probabilities of winning.

If the gambler has precise knowledge of the probabilities of winning, then he will systematically choose the machine having the highest probability in order to maximize his winnings. Since he does not have a priori knowledge of these probabilities, he will try to estimate them by gambling on all the different slot machines.

In the context considered, each channel is modeled as a slot machine having an unknown probability of being free (called 'a win').

4. SUMMARY

An exemplary embodiment of the present disclosure relates to a method of opportunistic access to a frequency band dedicated to a synchronous primary network by a secondary user. The frequency band is divided into K independent channels to which an indicator Bk and an average availability $\overline{S}_k$ are assigned. At each time frame t, the method includes observing, by the secondary user, the channel i having the greatest indicator Bi(t); and if the channel i is busy, updating the average availability $\overline{S}_i$ of channel i and updating indicator Bi (t) of the channel as a function of $\overline{S}_i$, and if the channel i is free: updating the average availability $\overline{S}_i$ of channel i, transmitting data set up during the frame t on channel i, computing a quality index Ri (t) of channel i, and updating indicators Bk (t) of the K channels as a function of the average availabilities $\overline{S}_k$ and Ri (t).

The method of opportunistic access presented in the present disclosure is aimed at improving the average performance as compared with the prior-art methods based on the multi-armed bandit model. More specifically, at least one embodiment increases the throughput rate of the data transmitted or received by the radio apparatus. At least one embodiment also improves the energy consumption of the radio apparatus.

5. FIGURES

Figure 2:
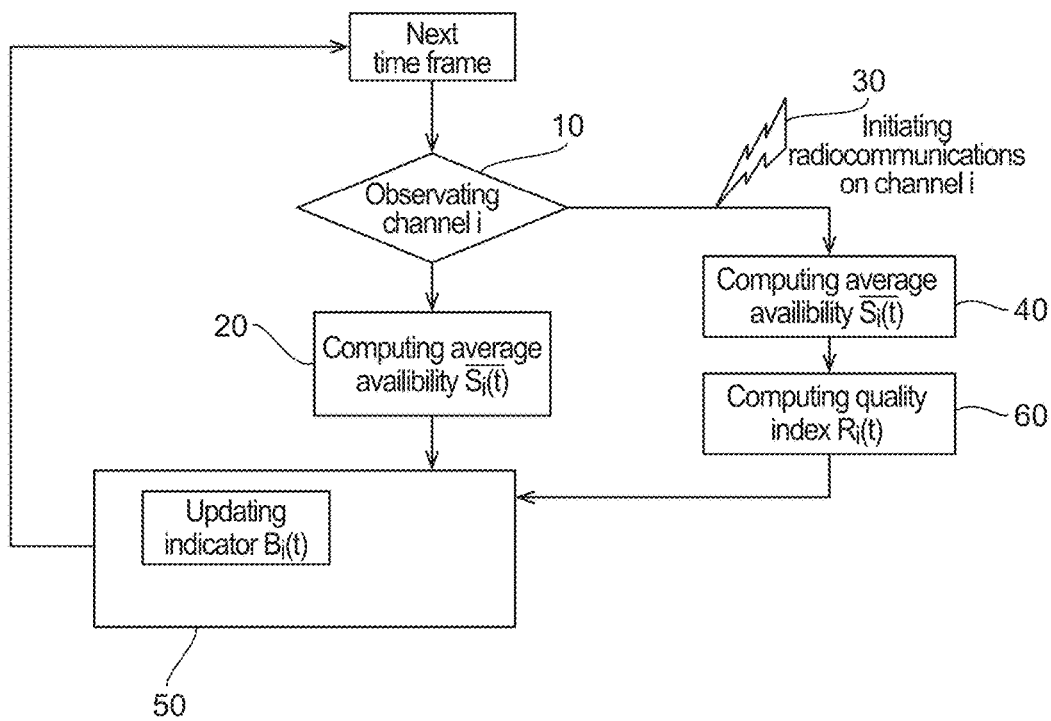
Figure 3:
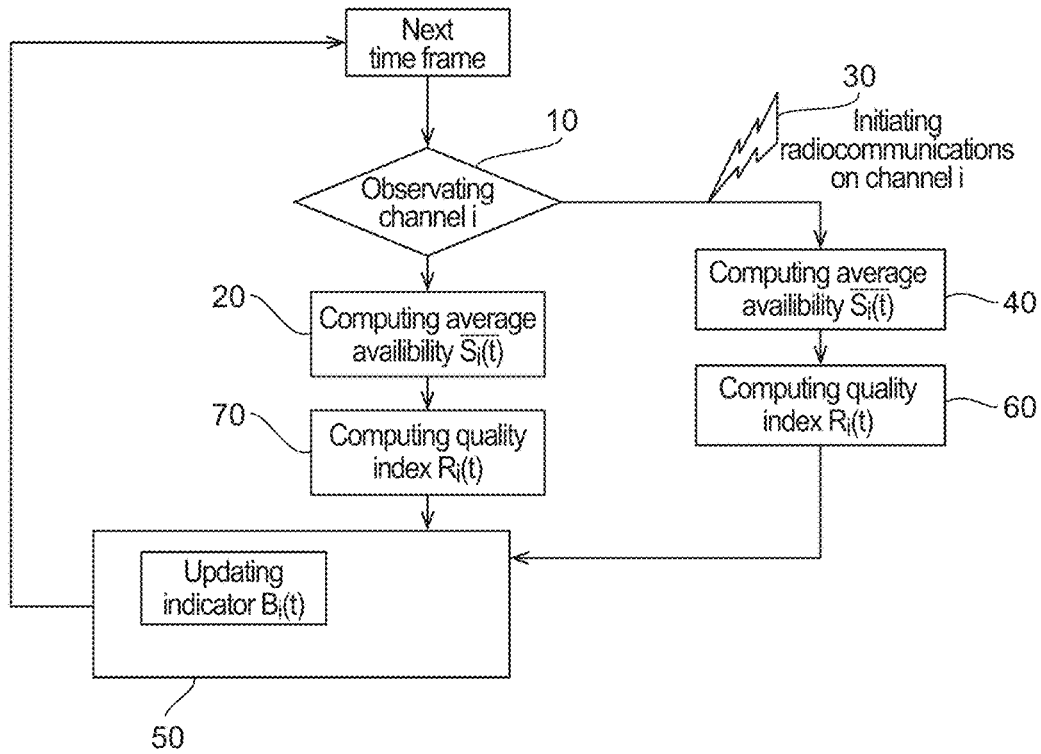
Figure 4:
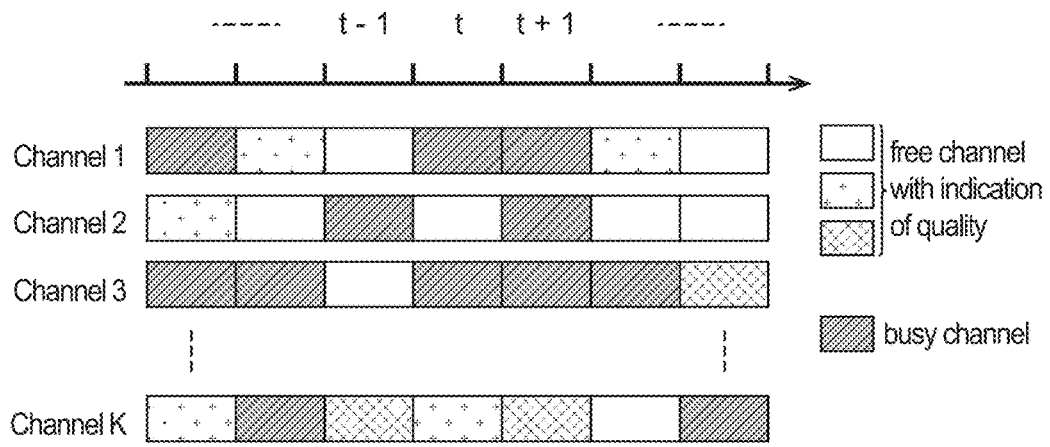
Figure 4:

Other features and advantages shall appear more clearly from the following description of one particular embodiment of the disclosure, given by way of a simple illustrative and non-exhaustive example and from the appended drawings, of which:

FIG. 1 schematically represents the principle of opportunistic access, by a secondary user, to the spectrum of a synchronous primary network according to the prior art;

FIG. 2 schematically represents a method of opportunistic access, by a secondary user, to a frequency band according to one embodiment of the present disclosure;

FIG. 3 schematically represents a method of opportunistic access to a frequency band according to another embodiment of the present disclosure;

FIG. 4 schematically represents the principle of opportunistic access, by a secondary user, to the spectrum of a synchronous primary network according to one embodiment compliant with the present innovation.

6. EMBODIMENT

Referring to FIGS. 2 to 4, we describe an embodiment compliant with the innovation proposed in the present disclosure.

Classically, a synchronous primary network places a frequency band, subdivided into k subbands called channels, at the disposal of a community of priority primary users.

The primary users do not permanently use the totality of the spectral resources. This gives non-priority secondary users opportunities to use the unutilized spectral resources. Such a primary network can, for example, be earmarked for civil security. It must be immediately available to civil security organizations in case of need but, most usually, the network is little used and is therefore an available spectrum resource that secondary users can access opportunistically. In general, opportunistic spectrum access by secondary users remains transparent for the primary users who perceive no modification whatsoever, either in the operation or in the quality of the service provided.

FIG. 1 shows a classic time-frequency matrix of availability of the K channels in a small duration of a few time frames, the free channels being shown as blank and the busy channels being shown in grey.

A secondary user seeks to obtain opportunistic access to this primary network. On the basis of experience obtained hitherto, this secondary user associates an indicator $B_k$ with each channel k. This indicator $B_k$ can vary with each time frame, especially as a function of an average availability $\overline{S}_k$ of the channel k empirically obtained from its prior experience. Since the secondary user does not have a priori knowledge of the characteristics of the primary network that it wishes to access, the variables $B_k$ and $\overline{S}_k$ are initialized, for example by being assigned arbitrary values or else by the execution of an initialization phase in which each channel k is scanned at least once.

As represented schematically in FIG. 2, at the start of each time frame t, the secondary user carries out an observation step 10, to verify the availability of the channel i, of which the indicator $B_i$ (t) is the highest. Different traditional methods of detection can be used, for example an energy detector (radiometer) or else a cyclostationarity detector.

If the channel i is not available for this time frame t, then, in a step 20, the secondary user computes an average availability $\overline{S}_i$ (t) of the channel i, and awaits the next time frame t+1 to try and set up radiocommunications with a distant user.

If the channel i is available for this time frame t, then the secondary user initiates radiocommunications 30 with a distant user, in using the spectral resources of the channel i. The secondary user computes an average availability $\overline{S}_i$ (t) of the channel in a step 40.

Whether the channel i is available or not during the time frame t, the indicator $B_i$ (t) will be updated in a step 50 as a function of $\overline{S}_i$ (t) to enable the secondary user to observe and then, as the case may be, during the time frame t+1 to use the channel j having the highest value of indicator $B_j$ (t+1).

Since each of the indicators $B_k$ is updated as a function of the average availability $\overline{S}_k$ of the channel considered, the secondary user makes use of the results of the successive phases of observation, so as to give preference to the most frequently available channels.

Up to this point, the method of opportunistic access described is similar to other methods described in the prior art. In the example represented in FIG. 1, these methods lead to a more frequent choice of the channels 2 and K, because, as and when the secondary user explores its environment, the indicators $B_2$ and $B_k$ will increase relative to indicators of the other channels which are less frequently available.

However, from the viewpoint of the secondary user, not all the free channels are of equal importance. The fact is that, while all these free channels enable it to effectively initiate communications with a distant user, certain available channels offer it better quality than do others. The method of opportunistic access according to the present disclosure enables the selection, as a priority, of the channels that are available and that, at the same time, offer the best quality.

According to a first embodiment shown in FIG. 2, when the channel is available and when its spectral resources used by the secondary user to carry out radiocommunications with a distant user, then a quality index $R_i(t)$ of the channel i is computed during the time frame t at a step 60. At the end of the time frame t, the indicators $B_k$ (t) of all the channels are updated as a function of the average availability $\overline{S}_i$ (t) and of the quality index $R_i$ (t) of the channel i.

The quality index $R_i$ (t) of the channel i can be computed in different ways. According to one embodiment, the signal-to-noise ratio (SNR) is measured during the transmission of data in the time frame t, and used to compute the quality index $R_i$ (t). According to another embodiment, it is the signal-to-interference-plus-noise-ratio (SINR) that is measured during the data transmission, and used.

In another embodiment, it is the secondary user's electricity consumption during data transmission that is estimated or measured, and used to compute the quality index $R_i$ (t). According to one embodiment shown in FIG. 3, a quality index $R_i$ (t) of the channel i is computed when the channel is occupied at a step 70. Naturally, since there is no data transmission, the quality index cannot be a measurement of the quality of a transmission like the signal-to-noise ratio or the signal-to-interference-plus-noise-ratio. It is however possible to obtain a quality index $R_i$, (t) of the channel from the results obtained during the observation phase 10 for verifying the availability of the channel i.

For example, if a radiometer, during the observation phase 10, classically measures $N_{sample}$ pairs of samples (X, Y), X being measured on a phase channel I and Y on a quadrature channel Q, then the output of the detector could be of the following type:

$$\text{Output} = \frac{1}{N_{sample}} \sum_{i=1}^{N_{sample}} (X_i^2 + Y_i^2)$$

In a classic way, the output of the detector is compared with a threshold to determine whether the channel is free or busy. When the channel is busy, the level of the output of the detector can serve at the step 70 to obtain a quality index $R_i$ (t) for the channel i because the higher the level of the output, the higher will the quality of the channel i be.

Similarly, quality indices $R_i$ (t) can be determined at the step 70 for the other types of detectors used in the observation phase 10 to verify the presence or absence of a signal on the channel i.

In one mode of implementation, a first mode of computing a quality index can be used when the channel is not free at the step 70, a second mode of computation (for example measuring the quality of the transmission) being used at the step 60 when the channel is free and when the secondary user accesses it opportunistically to set up a communication with a distant user.

According to one embodiment, the best quality index $R_{max}$ on all the channels is kept, and the difference between $R_{max}$ and $R_i$ (t) is taken into account during the updating of the indicator $B_i(t)$ at the step 50.

According to another mode of implementation, the average values $G_k$ of the quality indices $R_k$ of all the channels are kept, and each indicator $B_k$ (t) is updated at the step 50 as a function of the difference between $G_{max}$ and the preserved value $G_k$. This difference can be weighted by the number of times that the channel has been observed (i.e. the number of times when the indicator $B_k$ was the highest among the indicators of the K channels), from the start of the secondary user's opportunistic access to the spectrum of this primary network, so as to lead the secondary user to explore new channels that had hitherto been infrequently observed.

With the indicator $B_k$ being updated at the step 50 as a function of quality, this piece of data makes it possible to use the results of the quality measurements and hence give preference to the channels that are most frequently free while also offering quality and also, at the same time, to also makes it possible to explore the availabilities of other channels when a channel is very often free but is of low quality.

Finally, according to another embodiment, a bias $A_k$ (t) is computed for each channel, the indicator $B_k$ (t) being updated at the step 50 as a function of the bias $A_k$ (t). In particular, this bias can take account of the number of times that a given channel has been observed. In this way, the secondary user is led to explore the availabilities of the hitherto little observed channels when the frequently observed channels are not free with sufficient frequency, or when they do not offer sufficient quality.

By playing on the parameters of the function of updating the indicators $B_k$ of the step 50, greater or lesser weight can be given to the average availabilities $\overline{S}_k$, the measurement of the quality $R_i$ (t) and the biases $A_k$, so as to give preference to experience as regards quality, experience in terms of availability or else the exploration of infrequently observed channels.

In one particular embodiment, the secondary user is capable of observing several channels during each time frame t. If a transmission is done on only one of the observed available channels (the one having the highest indicator B), then the observation of several channels during the time frame t makes it possible to update the data on the average availability and on the quality of each channel more rapidly. In the same way, it becomes possible to have several observation strategies, for example one strategy based on experience and one exploratory strategy aimed at observing a channel on which the secondary user has little information available.

FIG. 4 corresponds to FIG. 1, with an indication of quality that can be obtained during one time frame when the channel is available. In the example shown in FIG. 4, the secondary user will prefer the channel 2 to the channel K because, even if the frequencies of availability of the two channels remain identical, since the quality index $R_2$ is better on an average than $R_K$, the indicator $B_2$ will increase more quickly than $B_K$. Ultimately, the secondary user will obtain better quality transmission than it would have obtained with a prior-art method of opportunistic access as shown in FIG. 1.

The invention also relates to a computer program product memorizing an executable code for the implementing of one of the previously described methods of opportunistic access to a frequency band, as well as a communications device comprising such a computer program product enabling it, when it is executed by the computer of the device, to opportunistically access the spectrum of a primary network according to one of the methods described here above.

Although the present disclosure has been described with reference to one or more examples, workers skilled in the art will recognize that changes may be made in form and detail without departing from the scope of the disclosure and/or the appended claims.

The invention claimed is:

1. A method of opportunistic access to a frequency band dedicated to a synchronous primary network by a secondary user device, the frequency band being divided into a number of K independent channels, an indicator $B_k$ and an average availability $\overline{S}_k$ being assigned to each channel k from the K independent channels, said method comprising:
 performing by the secondary user device, at each time frame t:
 observing by the secondary user device a channel i having a greatest indicator $B_i(t)$,
 updating an average availability $\overline{S}_i$ of the channel i,
 when the channel i is free:
  setting up a data transmission during the time frame t, on the channel i, between the secondary user device and a distant user device, and
  computing a quality index $R_i$ (t) of the channel i, and updating indicators $B_k$ (t) of the K independent channels as a function of the average availabilities $\overline{S}_k$, of the quality index $R_i$ (t) and as a function of a bias $A_k$ (t) computed for each channel k.

2. The method of opportunistic access to a frequency band according to claim 1, wherein the method further comprises:
 if the channel i is free,
 measuring a quality of the data transmission, and
 computing the quality index $R_i$ (t) of the channel i as a function of the measured quality of the data transmission.

3. The method of opportunistic access to a frequency band according to claim 2, wherein:
 the quality of the data transmission is measured by a signal-to-noise ratio or a signal-to-interference-plus-noise-ratio.

4. The method of opportunistic access to a frequency band according to claim 2, wherein:
 the quality of the data transmission is measured by an electricity consumption during the data transmission.

5. The method of opportunistic access to a frequency band according to claim 1, wherein the method comprises:
 when the channel i is busy, the secondary user device further performs:

computing a quality index $R_i(t)$,
updating the indicators $B_k(t)$ of the K independent channels as a function of the average availability $\overline{S}_k$ and the quality index $R_i(t)$.

6. The method of opportunistic access to a frequency band according to claim 5, wherein:
the quality index $R_i(t)$ of the channel i is computed as a function of an energy measured by a radiometer.

7. A non-transitory computer-readable medium comprising a computer program product stored thereon and having an executable code for implementing a method of opportunistic access to a frequency band when the code is executed by a processor of a secondary user device, wherein the frequency band is dedicated to a synchronous primary network, and the frequency band is divided into a number of K independent channels, an indicator $B_k$ and an average availability $\overline{S}_k$ being assigned to each channel k from the K independent channels, wherein said executable code comprising:
executable code that configures the secondary user device, at each time frame t to:
observe a channel i having a greatest indicator $B_i(t)$,
update an average availability $\overline{S}_i$ of the channel i,
when the channel i is free:
set up a data transmission during the time frame t, on the channel i, between the secondary user device and a distant user device, and
compute a quality index $R_i(t)$ of the channel i, and
update indicators $B_k(t)$ of the K independent channels as a function of the average availabilities $\overline{S}_k$, of the quality index $R_i(t)$ and as a function of a bias $A_k(t)$ computed for each channel k.

8. A communications device comprising:
a radiocommunications device;
at least one battery;
at least one computer;
memory;
at least one sensor capable of observing the availability of a frequency channel; and
a computer program product stored in the memory and having an executable code for implementing a method of opportunistic access to a frequency band when the code is executed by the at least one computer, wherein the frequency band is dedicated to a synchronous primary network, and the frequency band is divided into a number of K independent channels, an indicator $B_k$ and an average availability $\overline{S}_k$ being assigned to each channel k from the K independent channels, and wherein the executable code comprises:
executable code that configures the communications device, at each time frame t to:
observe a channel i having a greatest indicator $B_i(t)$,
update an average availability $\overline{S}_i$ of the channel i,
when the channel i is free:
set up a data transmission during the time frame t, on the channel i, between the secondary user device and a distant user device, and
compute a quality index $R_i(t)$ of the channel i, and
update indicators $B_k(t)$ of the K independent channels as a function of the average availabilities $\overline{S}_i$, of the quality index $R_i(t)$ and as a function of a bias $A_k(t)$ computed for each channel k.

* * * * *